United States Patent
Han et al.

(10) Patent No.: US 8,774,871 B2
(45) Date of Patent: Jul. 8, 2014

(54) APPARATUS, METHOD AND COMPUTER-READABLE MEDIUM GENERATING ULTRASONIC WAVES AND VIBRATION

(75) Inventors: Jae Joon Han, Seoul (KR); Won-Chul Bang, Seongnam-Si (KR); Sang-Youn Kim, Seoul (KR); Tae Heon Yang, Daejeon (KR)

(73) Assignees: Samsung Electronics Co., Ltd., Suwon-Si (KR); Korea University of Technology and Education Industry-University Cooperation Foundation, Cheonan-Si (KR)

( * ) Notice: Subject to any disclaimer, the term of this patent is extended or adjusted under 35 U.S.C. 154(b) by 902 days.

(21) Appl. No.: 12/923,258

(22) Filed: Sep. 10, 2010

(65) Prior Publication Data
US 2011/0070925 A1     Mar. 24, 2011

(30) Foreign Application Priority Data
Sep. 11, 2009  (KR) .................... 10-2009-0085723

(51) Int. Cl.
*H04W 88/02* (2009.01)
*H04M 19/04* (2006.01)

(52) U.S. Cl.
USPC ............ 455/567; 455/140; 455/68; 310/310; 310/317; 310/323.16

(58) Field of Classification Search
CPC ....... H04W 4/00; H04W 12/06; H04W 76/02; H04W 88/02; H04M 2250/12; H04M 19/04; H04M 19/047
See application file for complete search history.

(56) References Cited

U.S. PATENT DOCUMENTS

| | | | |
|---|---|---|---|
| 2002/0050765 A1* | 5/2002 | Magnussen et al. | 310/323.16 |
| 2002/0151777 A1* | 10/2002 | Hynynen et al. | 600/407 |
| 2005/0116583 A1* | 6/2005 | Nishio et al. | 310/317 |
| 2005/0280333 A1* | 12/2005 | Miyazaki | 310/317 |
| 2008/0164783 A1* | 7/2008 | Okada | 310/323.16 |
| 2010/0027409 A1* | 2/2010 | Kwon et al. | 370/210 |

* cited by examiner

*Primary Examiner* — Ajibola Akinyemi
*Assistant Examiner* — Fanghwa Wang
(74) *Attorney, Agent, or Firm* — Staas & Halsey LLP

(57) ABSTRACT

Provided is a vibration apparatus, method and computer-readable medium generating vibrations and ultrasonic waves. The vibration apparatus, method and computer-readable medium may generate the vibrations or the ultrasonic waves in accordance with a first control signal and a second control signal each having a frequency band different from each other.

8 Claims, 6 Drawing Sheets

APPARATUS, METHOD AND COMPUTER-READABLE MEDIUM GENERATING ULTRASONIC WAVES AND VIBRATION

CROSS-REFERENCE TO RELATED APPLICATIONS

This application claims the benefit of Korean Patent Application No. 10-2009-0085723, filed on Sep. 11, 2009, in the Korean Intellectual Property Office, the disclosure of which is incorporated herein by reference.

BACKGROUND

1. Field

One or more embodiments relate to vibration generation, and ultrasonic wave generation.

2. Description of the Related Art

Along with developments in technologies, mobile electronic equipment including a mobile phone, a personal digital assistant (PDA), and the like have been widely used. The mobile electronic equipment may perform communications with users using vibrations. For example, when receiving a call, an actuator mounted in the mobile phone may generate vibrations to inform a user about the call. Also, when the user presses on a specific portion of a screen of the mobile phone, the actuator may generate predetermined vibrations to inform the user about the pressed specific portion.

Also, the mobile electronic equipment may perform communications with other mobile electronic equipment using ultrasonic waves. The mobile electronic equipment may generate the ultrasonic waves using the actuator, and transmit, to the other mobile electronic equipment, data using the generated ultrasonic waves.

The mobile electronic equipment may measure a distance with the other mobile electronic equipment using the ultrasonic waves. For example, the mobile electronic equipment may generate the ultrasonic waves using the actuator, and receive the ultrasonic waves reflected by the other mobile electronic equipment. In this manner, the mobile electronic equipment may measure the distance from other mobile electronic equipment using a point in time when the ultrasonic waves are generated and a point in time when the reflected ultrasonic waves are received.

SUMMARY

The foregoing and/or other aspects are achieved by providing a vibration apparatus, including: a control unit to generate an electrical signal of a first frequency band and an electrical signal of a second frequency band; and an actuator to generate ultrasonic waves in accordance with the electrical signal of the first frequency band, and to generate vibrations in accordance with the electrical signal of the second frequency band.

The foregoing and/or other aspects are achieved by providing a method of controlling vibrations, including: generating an electrical signal of a first frequency band and an electrical signal of a second frequency band; and generating ultrasonic waves in accordance with the electrical signal of the first frequency band, or generating vibrations in accordance with the electrical signal of the second frequency band.

The foregoing and/or other aspects are achieved by providing at least one computer-readable medium having computer readable instructions that control at least one processor to implement a method controlling vibrations, including: generating an electrical signal of a first frequency band and an electrical signal of a second frequency band; and generating ultrasonic waves in accordance with the electrical signal of the first frequency band, or generating vibrations in accordance with the electrical signal of the second frequency band.

According to exemplary embodiments, it may be possible to selectively generate ultrasonic waves or vibrations using a single apparatus.

According to exemplary embodiments, it may be possible to simultaneously generate ultrasonic waves and vibrations.

According to exemplary embodiments, it may be possible to reduce a size and a weight of mobile electronic equipment and the like.

The foregoing and/or other aspects are achieved by providing at least one computer readable medium including computer readable instructions that control at least one processor to implement methods of one or more embodiments.

Additional aspects, features, and/or advantages of exemplary embodiments will be set forth in part in the description which follows and, in part, will be apparent from the description, or may be learned by practice of the disclosure.

BRIEF DESCRIPTION OF THE DRAWINGS

These and/or other aspects and advantages will become apparent and more readily appreciated from the following description of the exemplary embodiments, taken in conjunction with the accompanying drawings of which.

DETAILED DESCRIPTION

Figure 1:
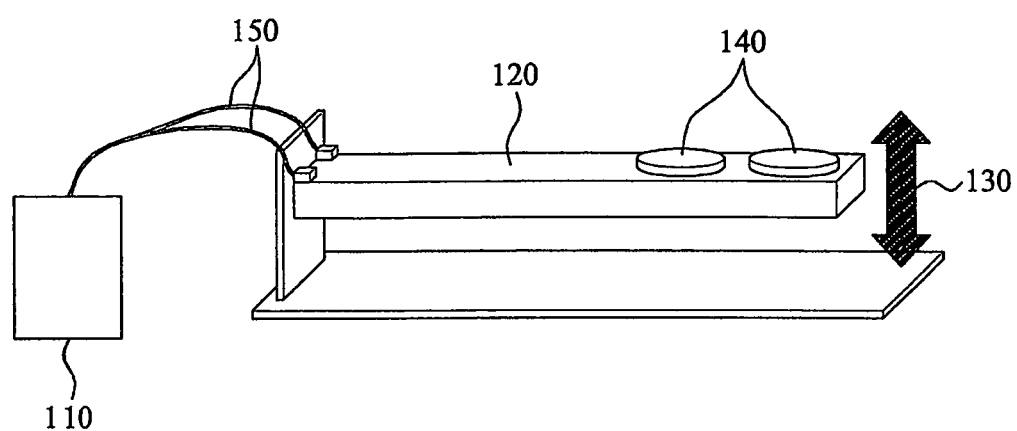
FIG. 1 illustrates a vibration apparatus generating ultrasonic waves and vibrations according to example embodiments.

Reference will now be made in detail to exemplary embodiments, examples of which are illustrated in the accompanying drawings, wherein like reference numerals refer to like elements throughout. Exemplary embodiments are described below to explain the present disclosure by referring to the figures.

FIG. 1 illustrates an example of a vibration apparatus of generating ultrasonic waves and vibrations according to example embodiments.

A control unit 110 may generate an electrical signal of a first frequency band and an electrical signal of a second frequency band different from the first frequency band.

According to example embodiments, the first frequency band may be higher than the second frequency band.

The first frequency band and the second frequency band will be further described with reference to FIG. 4.

Hereinafter, the electrical signal of the first frequency band may be referred to as a first electrical signal, and the electrical signal of the second frequency band may be referred to as a second electrical signal.

The first electrical signal and the second electrical signal may be transmitted to an actuator 120 using a connection unit 150.

The actuator 120 may generate ultrasonic waves in accordance with the first electrical signal, and generate vibrations in accordance with the second electrical signal. According to an embodiment, the actuator 120 may be comprised of Piezo elements. The Piezo elements may designate elements creating a physical effect depending on the electrical signal.

According to an embodiment, the actuator 120 may be expanded or contracted in accordance with the first electrical signal or the second electrical signal. It is assumed that the first electric signal and the second electrical signal are alternating current signals. If the electrical signal has a phase of '+,' the actuator 120 may be expanded, and if the electrical signal has a phase of '−,' the actuator 120 may be contracted. Alternatively, when a power of the electrical signal exceeds a predetermined threshold, the actuator 120 may be expanded. When the power of the electrical signal is equal to or less than the predetermined threshold, the actuator 120 may be contracted.

Changes in the phase and power of the electrical signal may be determined depending on a frequency of the electrical signal.

The actuator 120 may have inherent characteristics depending on its shape including a length, an area, and the like. Depending on the shape of the actuator 120, a frequency band of the electrical signal may be determined which expands or contracts the actuator 120.

Also, depending on the shape of the actuator 120, a cycle may be determined which expands or contracts the actuator.

When the actuator 120 is repeatedly expanded or contracted in a specific cycle, the actuator 120 may generate sound waves. According to an embodiment, the actuator 120 may generate sound waves of an ultrasonic wave band. Also, when the actuator 120 is repeatedly expanded or contracted in the specific cycle, the actuator 120 may generate vibrations.

The shape of the actuator 120 included in the vibration apparatus may be fixed. In addition, whether the actuator 120 generates the ultrasonic waves or the vibrations may be determined depending on a frequency of the electrical signal applied to the actuator 120.

The control unit 110 may generate an electrical signal of the first frequency band to control the actuator 120 in order to generate the ultrasonic waves. Also, the control unit 110 may generate an electrical signal of the second frequency band to control the actuator 120 to generate the vibrations.

As illustrated in FIG. 1, the actuator 120 may generate vibrations in a vertical direction 130 in accordance with the first electrical signal or the second electrical signal. According to an embodiment, vibration plates 140 may be adhered on the actuator 120 in a vibration direction of the actuator 120. The vibration plates 140 may be vertically moved 130 by the vibrations of the actuator 120. The vibration plates 140 may be shaped into a plate. The vibration plates 140 may periodically pressure air while being vertically moved. A pressure of ambient air of the vibration plates 140 may be periodically increased or reduced, thereby maximizing the vibrations generated by the actuator 120.

According to an embodiment, the vibration plates 140 may be made of an elastic material.

Figure 2:
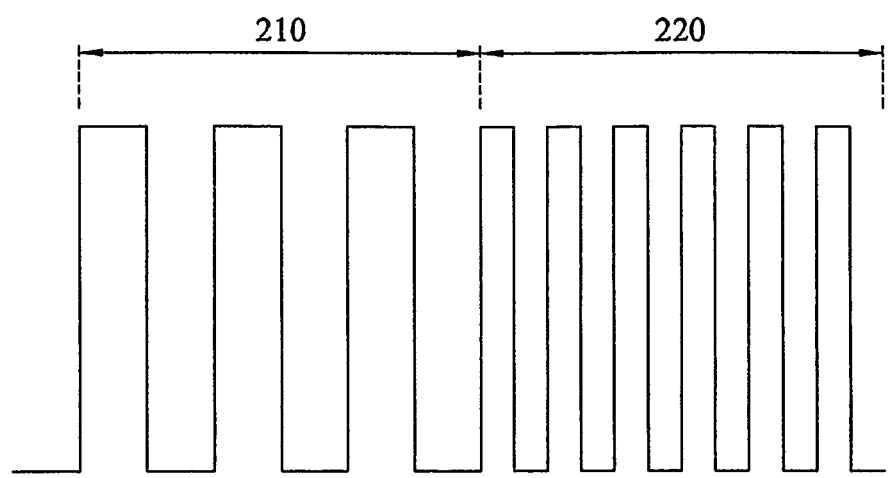
FIG. 2 is a conceptual diagram illustrating a first electric signal for generating ultrasonic waves and a second electric signal for generating vibrations according to example embodiments.

FIG. 2 is a conceptual diagram illustrating a first electrical signal 220 generating ultrasonic waves and a second electrical signal 210 generating vibrations according to example embodiments.

The first electrical signal 220 and the second electrical signal 210 may be alternating current signals. In FIG. 2, each of the first electrical signal 220 and the second electrical signal 210 may be a rectangular pulse, however, according to other example embodiments, each of the first electrical signal 220 and the second electrical signal 210 may be a sine wave.

The rectangular pulse may be understood as specific sine waves generated such that a plurality of sine waves are overlapped.

When the first electrical signal 220 or the second electrical signal 210 is an alternating current signal, each of the electrical signals may have an inherent fundamental frequency. When each of the electrical signals is the sine wave, a frequency of each of the electrical signals may be a fundamental frequency, when each of the electrical signals is the rectangular pulse, as illustrated in FIG. 2, a lowest frequency from among frequencies of the plurality of sine waves may be the fundamental frequency. As illustrated in FIG. 2, a fundamental frequency of the first electrical signal 220 may be higher than a fundamental frequency of the second electrical signal 210.

As described above, the first frequency band may be a frequency band of the first electrical signal 220, and the second frequency band may be a frequency band of the second electrical signal 210. When the fundamental frequency of the first electrical signal 220 is higher than the fundamental frequency of the second electrical signal 210, the first frequency band may be understood as being higher than the second frequency band.

According to example embodiments, the actuator 120 may generate the ultrasonic waves in accordance with the first electrical signal 220 having a higher frequency band, and may generate the vibrations in accordance with the second electrical signal 210 having a lower frequency band.

Figure 3:
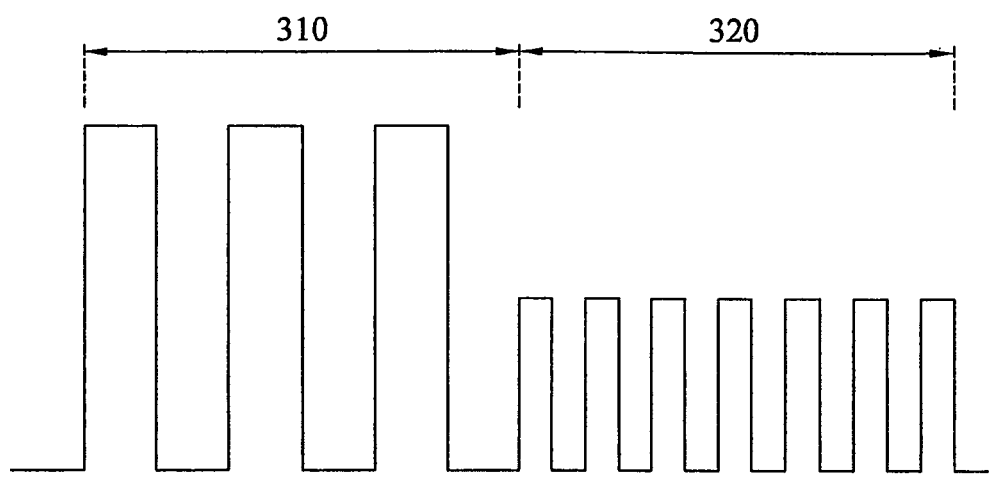
FIG. 3 illustrates a power of a first electrical signal differing from a power of a second electrical signal according to example embodiments.

FIG. 3 illustrates example embodiments where power of a first electrical signal differs from power of a second electrical signal. In FIG. 3, a horizontal axis may signify a passage of time, and a vertical axis may signify power of each electrical signal.

According to example embodiments, to generate vibrations, the actuator 120 may be more significantly expanded or contracted in comparison with generating ultrasonic waves. The control unit 110 may supply more energy to the actuator 120 to generate stronger vibrations.

The control unit 110 may differently designate a power of a second electrical signal 310 generating vibrations and a power of a first electrical signal 320 for generating ultrasonic waves. In FIG. 3, the power of the second electrical signal 310 may be higher than the power of the first electrical signal 320. When the power of the second electrical signal 310 is higher than the power of the first electrical signal 320, more energy may be supplied to the actuator 120 to thereby generate stronger vibrations.

In FIG. 3, the power of the second electrical signal 310 generating the vibrations is higher than the power of the first electrical signal 320 generating the ultrasonic waves, however, according to other example embodiments, the opposite may be possible.

Figure 4:
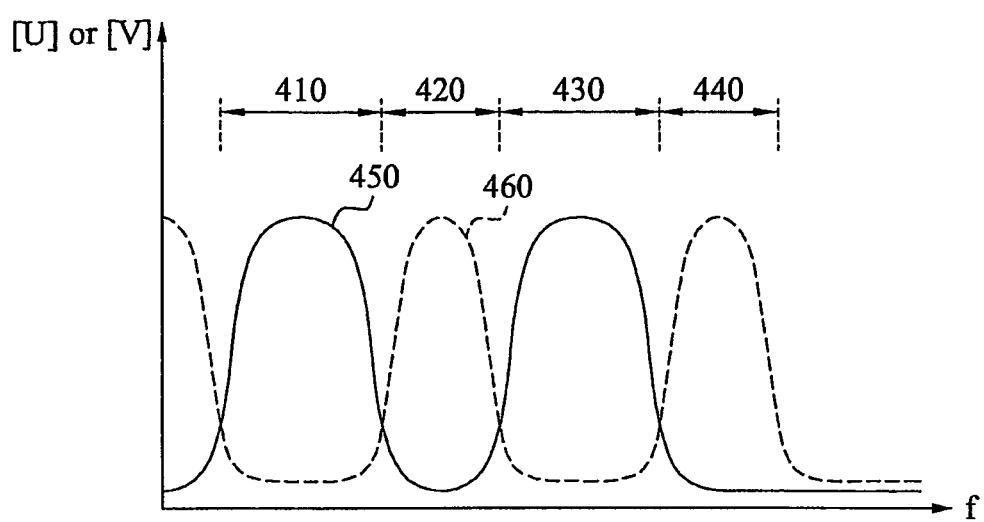
FIG. 4 is a conceptual diagram illustrating where the vibration apparatus of FIG. 1 generates vibrations or ultrasonic waves in accordance with each frequency band according to example embodiments.

FIG. 4 is a conceptual diagram illustrating example embodiments where the vibration apparatus of FIG. 1 generates vibrations or ultrasonic waves in accordance with each frequency band.

In FIG. 4, a horizontal axis may signify a frequency of an electrical signal applied to the actuator 120, and a vertical axis may signify a relative amplitude 450 of vibrations generated by the actuator 120 or a relative amplitude 460 of ultrasonic waves.

Referring to FIG. 4, the actuator 120 may generate the vibrations or the ultrasonic waves when specific frequency bands 410, 420, 430, and 440 of the electrical signal are applied to the actuator 120.

As for the relative amplitude 450 of the vibrations generated by the actuator 120, vibrations generated by the actuator 120 may be significantly strong in a first frequency band 410 and a third frequency band 430. Conversely, vibrations generated by the actuator 120 may not be strong in a second frequency band 420 and a fourth frequency band 440.

As for the relative amplitude 460 of the ultrasonic waves generated by the actuator 120, the ultrasonic waves may be significantly strong in the second frequency band 420 and the fourth frequency band 440. However, the ultrasonic waves may not be strong in the first frequency band 410 and the third frequency band 430.

When an amplitude of the ultrasonic waves generated by the actuator 120 in the first frequency band 410 and the third frequency band 430 is equal to or less than a predetermined first threshold, and when an amplitude of the vibrations generated by the actuator 120 in the second frequency band 420 and the fourth frequency band 440 is equal to or less than a predetermined second threshold, it may be understood that the actuator 120 generates the vibrations in the first and third frequency bands 410 and 430, and the actuator 120 generates the ultrasonic waves in the second and fourth frequency bands 420 and 440.

In FIG. 4, according to example embodiments, the actuator 120 generates the vibrations in a plurality of frequency bands 410 and 430, and generates the ultrasonic waves in a plurality of frequency bands 420 and 440. However, according to other example embodiments, the actuator 120 may generate the vibrations or the ultrasonic waves only in a specific frequency band.

Figure 5:
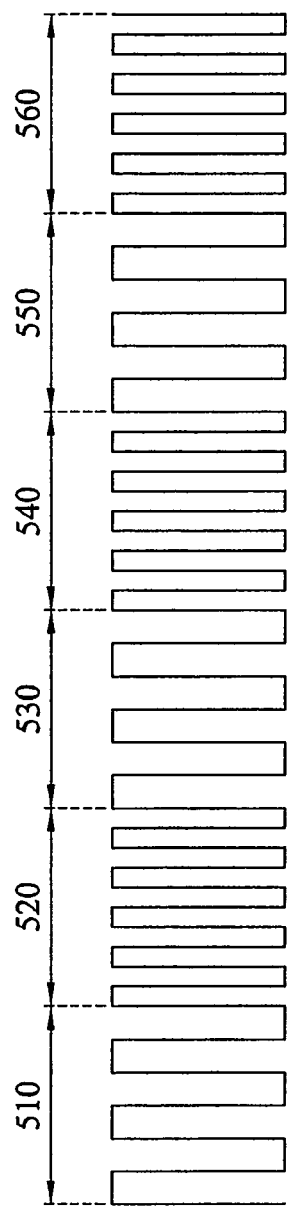
FIG. 5 illustrates simultaneously generating vibrations and ultrasonic waves using a Time Division Multiplexing (TDM) scheme according to example embodiments.

FIG. 5 illustrates simultaneously generating vibrations and ultrasonic waves using a Time Division Multiplexing (TDM) scheme according to example embodiments.

The TDM scheme may be a scheme in which an apparatus providing one service at a time is used by dividing time. A specific apparatus may provide a specific service in a specific point in time, however, by means of the TDM scheme, a plurality of services may be respectively provided by dividing time, whereby users using different services may use each of the plurality of services without stopping corresponding services.

The vibration apparatus may provide a single service in a specific point in time such as generating vibrations or generating ultrasonic waves. However, the apparatus may be operated by simultaneously generating the vibrations and the ultrasonic waves using the TDM scheme.

According to the example embodiments of FIG. 5, the control unit 110 may generate a first electrical signal and a second electrical signal using the TDM scheme. That is, the control unit 110 may divide, into a plurality of time slots, a time interval simultaneously generating the vibrations and the ultrasonic waves using the TDM scheme, and the first electrical signal and the second electrical signal may be alternatively generated in each of the plurality of time slots.

The actuator 120 may generate the ultrasonic waves in accordance with first electrical signals 520, 540, and 560, and generate the vibrations in accordance with second electrical signals 510, 530, and 550.

When each of the time slots of the first electrical signals 520, 540, and 560 and each of the time slots of the second electrical signals 510, 530, and 550 are sufficiently short, the ultrasonic waves and the vibrations are simultaneously generated.

Figure 6:
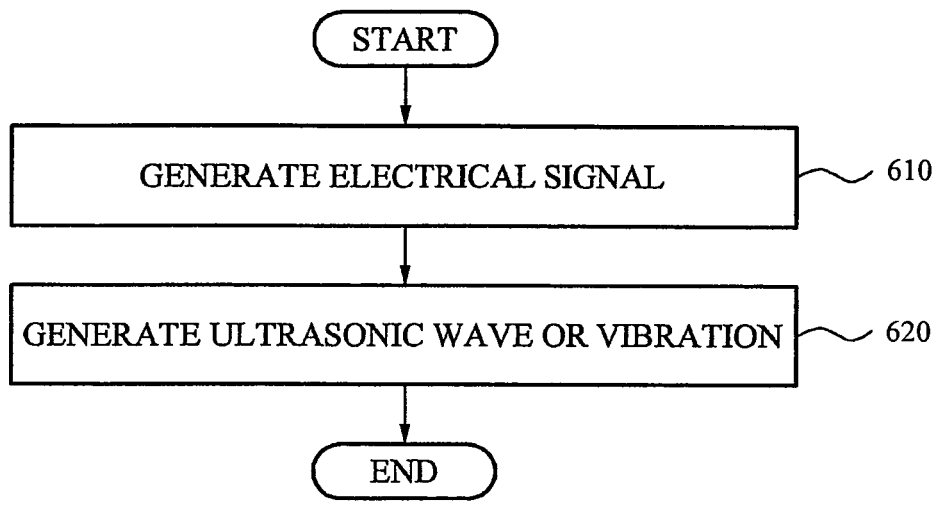
FIG. 6 is a flowchart illustrating a method of generating ultrasonic waves or vibrations using a first electrical signal and a second electrical signal according to example embodiments.

FIG. 6 is a flowchart illustrating a method of generating ultrasonic waves or vibrations using a first electrical signal and a second electrical signal according to example embodiments.

In operation 610, the vibration apparatus of FIG. 1 may generate a first electrical signal of a first frequency band and a second electrical signal of a second frequency band. According to example embodiments, the first frequency band may be higher than the second frequency band.

In operation 620, the vibration apparatus may generate ultrasonic waves in accordance with the first electrical signal of the first frequency band, or generate vibrations in accordance with the second electrical signal of the second frequency band.

According to example embodiments, a power of the second electrical signal of the second frequency band may differ from a power of the first electrical signal of the first frequency band. The first electrical signal may be used for generating vibrations, and the second electrical signal may be used for generating ultrasonic waves. Accordingly when the power of the first electrical signal increases, stronger vibrations may be generated using more energy.

According to an embodiment, in operation 610, the first electrical signal and the second electrical signal may be generated using the TDM scheme.

In operation 610, the vibration apparatus may divide, into a plurality of time slots, a predetermined time interval, and alternatively generate the first electrical signal and the second electrical signal in each of the plurality of time slots.

The vibration apparatus may alternatively generate the vibrations or the ultrasonic waves in accordance with the first electrical signal and the second electrical signal. When each of the plurality time slots during which the vibration and the ultrasonic waves are generated is relatively short, the vibrations and the ultrasonic waves are simultaneously generated.

The above described method of controlling vibrations may be recorded, stored, or fixed in one or more computer-readable storage media that includes program instructions to be implemented by a computer to cause a processor to execute or perform the program instructions. The media may also include, alone or in combination with the program instructions, data files, data structures, and the like. The media and program instructions may be those specially designed and constructed, or they may be of the kind well-known and available to those having skill in the computer software arts. Examples of computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. The computer-readable media may also be a distributed network, so that the program instructions are stored and executed in a distributed fashion. The program instructions may be executed by one or more processors. The computer-readable media may also be embodied in at least one application specific integrated circuit (ASIC) or Field Programmable Gate Array (FPGA), which executes (processes like a processor) program instructions. Examples of program instructions include both machine code, such as produced by a compiler, and files containing higher level code that may be executed by the computer using an interpreter. The described hardware devices may be configured to act as one or more software modules in order to perform the operations and methods described above, or vice versa.

Although exemplary embodiments have been shown and described, it should be appreciated by those skilled in the art that changes may be made in these exemplary embodiments without departing from the principles and spirit of the disclosure, the scope of which is defined in the claims and their equivalents.

What is claimed is:

1. A vibration apparatus, comprising:
 a control unit to generate an electrical signal of a first frequency band and an electrical signal of a second frequency band; and
 an actuator to generate ultrasonic waves using the electrical signal of the first frequency band, and to generate vibrations using the electrical signal of the second frequency band,
 wherein the first frequency band is higher than the second frequency band,
 wherein the actuator generates a relatively stronger ultrasonic wave in the first frequency band compared to an ultrasonic wave generated by the actuator in the second frequency band, and the actuator generates a relatively stronger vibration in the second frequency band compared to a vibration generated by the actuator in the first frequency band,
 wherein the actuator generates vibrations in a plurality of frequency bands and generates ultrasonic waves in a plurality of frequency bands,
 wherein the actuator generates vibrations and ultrasonic waves in alternating frequency bands among the vibrations in the plurality of frequency bands and the ultrasonic waves in the plurality of frequency bands.

2. The vibration apparatus of claim 1, wherein the actuator generates vibrations in a predetermined vibration direction, and the vibration apparatus further comprises one or more vibration plates attached on the actuator in the vibration direction.

3. The vibration apparatus of claim 1, wherein a power of the electrical signal of the second frequency band differs from a power of the electrical signal of the first frequency band.

4. The vibration apparatus of claim 1, wherein the control unit generates the electrical signal of the first frequency band and the electrical signal of the second frequency band using a Time Division Multiplexing (TDM) scheme.

5. A method of controlling vibrations, comprising:
 generating, by a processor, an electrical signal of a first frequency band and an electrical signal of a second frequency band; and
 generating, using an actuator, ultrasonic waves using the electrical signal of the first frequency band, or generating vibrations using the electrical signal of the second frequency band,
 wherein the first frequency band is higher than the second frequency band,
 wherein the actuator generates a relatively stronger ultrasonic wave in the first frequency band compared to an ultrasonic wave generated by the actuator in the second frequency band, and the actuator generates a relatively stronger vibration in the second frequency band compared to a vibration generated by the actuator in the first frequency band,
 wherein the actuator generates vibrations in a plurality of frequency bands and generates ultrasonic waves in a plurality of frequency bands,
 wherein the actuator generates vibrations and ultrasonic waves in alternating frequency bands among the vibrations in the plurality of frequency bands and the ultrasonic waves in the plurality of frequency bands.

6. The method of claim 5, wherein a power of the electrical signal of the second frequency band differs from a power of the electrical signal of the first frequency band.

7. The method of claim 5, wherein the control unit generates the electrical signal of the first frequency band and the electrical signal of the second frequency band using a Time Division Multiplexing (TDM) scheme.

8. At least one non-transitory computer-readable medium comprising computer readable instructions that control at least one processor to implement a method controlling vibrations, comprising:
 generating an electrical signal of a first frequency band and an electrical signal of a second frequency band; and
 generating, using an actuator, ultrasonic waves using the electrical signal of the first frequency band, or generating vibrations using the electrical signal of the second frequency band,
 wherein the first frequency band is higher than the second frequency band,
 wherein the actuator generates a relatively stronger ultrasonic wave in the first frequency band compared to an ultrasonic wave generated by the actuator in the second frequency band, and the actuator generates a relatively stronger vibration in the second frequency band compared to a vibration generated by the actuator in the first frequency band,
 wherein the actuator generates vibrations in a plurality of frequency bands and generates ultrasonic waves in a plurality of frequency bands,
 wherein the actuator generates vibrations and ultrasonic waves in alternating frequency bands among the vibrations in the plurality of frequency bands and the ultrasonic waves in the plurality of frequency bands.

* * * * *